United States Patent [19]

Quentin et al.

[11] Patent Number: 5,748,500
[45] Date of Patent: May 5, 1998

[54] SYSTEM TO ASSESS THE STARTING PERFORMANCE OF A TURBINE

[75] Inventors: George Heinz Quentin, San Jose, Calif.; Robert Alfred Yannone, Lansdowne, Pa.

[73] Assignee: Electric Power Research Institute, Inc., Palo Alto, Calif.

[21] Appl. No.: 557,844

[22] Filed: Nov. 14, 1995

[51] Int. Cl.$^6$ .............................. G06F 11/00; G01M 19/00
[52] U.S. Cl. ..................... 364/551.01; 364/552; 364/554
[58] Field of Search ............................. 364/551.01, 494, 364/184, 552, 554; 395/180, 183.01, 183.02, 184.01

[56] References Cited

U.S. PATENT DOCUMENTS

| | | | |
|---|---|---|---|
| 3,924,141 | 12/1975 | Yannone et al. | 290/40 |
| 4,575,663 | 3/1986 | Papson et al. | 318/305 |
| 4,719,587 | 1/1988 | Berte | 364/552 |
| 5,033,012 | 7/1991 | Wohld . | |
| 5,070,458 | 12/1991 | Gilmore et al. | 364/424.06 |
| 5,210,704 | 5/1993 | Husseiny | 364/551.01 |
| 5,245,554 | 9/1993 | Tsuyama et al. | 364/552 |
| 5,463,567 | 10/1995 | Boen et al. | 364/551.01 |
| 5,566,091 | 10/1996 | Schricker et al. | 364/551.01 |

Primary Examiner—Emanuel T. Voeltz
Assistant Examiner—Tony M. Cole
Attorney, Agent, or Firm—Flehr Hohbach Test Albritton & Herbert LLP; William S. Galliani

[57] ABSTRACT

An apparatus and method to assess the performance of a start of a turbine is described. The apparatus includes an accumulator to compare a set of on-line data signals corresponding to the starting performance of the turbine to a set of normative starting parameters so as to identify a set of comparison signals. The comparison signals may also be identified by comparing the set of on-line data signals with a database of historical information relating to starts and design profiles of the turbine. In addition, the comparison signals may be identified by comparing the set of on-line data signals with information in an expert system defining fault conditions in previous starts of the turbine. The comparison signals are processed by an analyzer to identify those comparison signals that exceed predetermined thresholds. Those comparison signals that exceed the predetermined thresholds are processed by a risk factor assessor, which generates quality-of-start predication signals corresponding to the likelihood of success of future starts of the turbine. An anticipator then processes the quality-of-start prediction signals and generates output signals that are used to improve the starting performance of the turbine.

27 Claims, 8 Drawing Sheets

SYSTEM TO ASSESS THE STARTING PERFORMANCE OF A TURBINE

BACKGROUND OF THE INVENTION

1. Field of the Invention

This invention relates to a system for improving the starting reliability of turbines and other equipment. More particularly, this invention relates to a system for determining the "quality-of-start" of a turbine, for identifying the need for a specific maintenance action to assure the success of the next start and load sequence of the turbine, and for predicting the likelihood of a successful start of the turbine.

2. Description of Related Art

Turbines (and other industrial and utility equipment that uses or generates a significant amount of power) have automatic control systems to monitor and control the start up sequence. The purpose of these systems is to assure safe and efficient start up and operation of the equipment. These systems can either be fully automatic, requiring no operator intervention, or they can monitor the start up sequence and then advise an operator who can take an active role in bringing the equipment on line.

Typically, the start up sequence controller monitors key variables, such as valve positions or lube oil pressure, and prevents start up of the equipment if a key variable is not correct for start up. A simple example of a start up sequence controller application is a system used to automate the start of a large motor driven pump. Intelligent inputs to the controller include the position of the suction, discharge, and recirculating valves. The controller inhibits the start of the pump unless the suction and recirculation valves are open and the discharge valve is closed. This valve system protocol assures that there will be recirculating flow to prevent overheating of the pump and that the electric motor is started under minimum torque requirements.

In this example, valve position switches provide contact closures to indicate that the valves are either in the open or closed positions. The sequence controller, which can be an electro-mechanical relay logic system, programmable logic, or computer controller, inhibits closure of the power breaker to the motor unless the valves are in the proper position. Thus, each valve position, such as an open recirculation valve or an open suction valve, is a prerequisite (or permissive) for starting the motor.

More complicated equipment, such as steam turbines or combustion turbines, may include hundreds of permissives which must be satisfied before the equipment can be started. Usually in these complex systems, positioning of the valves and other parameters is accomplished by electric or pneumatic actuators controlled by the sequence controller. The operator gives the controller a command analogous to "Prepare to Start" and the sequence controller automatically positions the valves and starts up auxiliary equipment such as lube oil pumps and cooler fans. To assure that the boiler or turbine is not damaged by a start command when a valve or other parameter is not in the proper position or state, the sequence controller requires verification from independent position or pressure switches to satisfy the permissives before giving a start command. In other words, it is not sufficient that the controller commanded a certain valve to open, a feed back signal must indicate that the valve actually opened to its proper position before the controller gives the start command.

To initiate a start up, the operator prepares the equipment, waits a sufficient amount of time for the services and actuators to line up the system requirements and then gives a "Start" command. If all input requirements are satisfied correctly, in other words, all start permissives are met, the turbine starts when the operator gives the "Start" command. However, quite often because one or more permissives were not satisfied, the equipment does not start. At this point, the operator must review the sequence controller logic diagrams and alarm status to determine which permissives or shutdowns were not met and thereby prevented a successful start up. The malfunction may be difficult to detect and the repair process can be a very time consuming project. Some sequence controllers contain diagnostic aids to assist the operator in trouble shooting the cause of a failed start. These diagnostic aids can range from indicating lamps or light emitting diodes (LEDs) on each permissive input indicating which permissives have not been met, to complicated programmable or relay logic diagnostics to pinpoint the permissive which prohibited a successful start.

Even with these diagnostic aids, it can take a substantial amount of time to isolate the cause of a start failure. More importantly, the diagnostic aids are normally limited to determining the problem after the equipment failed to start. Often sequence controllers are applied to equipment necessary for emergency operation, such as an emergency diesel generator or standby generating equipment, such as a utility peaker gas turbine generator in peaking duty. For these types of equipment, it is essential that the unit successfully start during the relatively short "window-of-opportunity" following its receipt of a start up command.

One way of providing some assurance that the equipment will start is to test start the unit at frequent intervals. A satisfactory testing program is very labor intensive and is hard on the equipment. In most testing programs, if the equipment successfully starts, it is manually shut down right away. This type of short duration operation of equipment shortens the remaining useful life of the equipment by expending nonproductive start up cycles and thereby causing unnecessary thermal stresses.

From the above discussion, it is apparent that what is needed is a reliable method of predicting the likelihood that a future start of a piece of equipment will be successful, without subjecting the equipment to unnecessary stress imposed by test starts.

SUMMARY OF THE INVENTION WITH OBJECTS

It is one object of the present invention to provide a highly reliable predictor of the likelihood of success of future starts of automated equipment.

It is a more particular object of the present invention to provide a highly reliable predicator of the likelihood of success of future starts of a gas turbine peaking unit.

It is another object of the present invention to identify potential future start up problems for equipment having an automatic sequence controller which automates the start up process.

It is still another object of the present invention to provide an analysis of prior start histories to predict the success of future starts without subjecting the controlled equipment to unnecessary test starts and their resultant wear and tear.

It is still another object of the present invention to provide a diagnostic aid to technicians which allows them to pinpoint and resolve control system component and auxiliary equipment failures which would prevent the start up of a major piece of equipment, such as a combustion turbine, before an attempt is made to start the equipment.

It is still another object of the present invention to provide a risk matrix for assessment of parameters for predictive conclusions. The matrix forms an envelope by which all elements or functions associated with a particular fault or condition are tabulated or assessed for value.

It is also an important object of the present invention to anticipate or predict an equipment shutdown prior to its actual occurrence.

It is still another object of the present invention to provide instructions to the existing control system to prevent shutdown from measured marginal operation.

These and other objects are attained in a quality-of-start-precursor (QSP) system which monitors a number of variables during the start up procedure of equipment and analyzes the progress of these variables during the sequence to predict the likelihood of success for future starts. Thus, the QSP system predicts malfunction conditions. The system receives various inputs, such as turbine RPM signals, control system variable signals, pressure signals, and temperature signals and determines whether certain parameters and profiles were attained within time and speed specifications and within quality-of-start design margins. This system also takes advantage of unique transient oddities that occur during fired acceleration due to some mode of control or equipment disfunction. The system evaluates a matrix of key selected variables that indicate degradation from preselected design conditions. The different key factors assembled for the risk matrix are assigned weighted values proportional to their contribution to the predictive conclusion to determine the success of the next start. The weighting factors are assigned for both credibility and probability to enhance the precursor decision.

In addition, the system provides unique information to maintenance personnel to allow correction of degraded performance before that degraded performance inhibits the start up of the equipment. This feature is especially useful with peaking gas turbines, which normally have a low capacity factor and require a high degree of starting reliability. The availability of this predictive risk tool enables the utility peaking unit to take advantage of the low capacity usage and subsequent down time.

DESCRIPTION OF THE PREFERRED EMBODIMENTS

The quality-of-start-precursor (QSP) system of the invention is disclosed in relation to an industrial type gas turbine generator. The disclosure of the invention in this context will clearly illustrate the benefits associated with the technology. However, it should be appreciated that the same technology can be applied to predict the likelihood of success of future starts of any type of equipment or machine, such as diesel engines, compressors, heat exchangers, and boilers. The technology may also be used to provide predictive analyses for interpreting on line problems that may affect shutdown reliability.

Figure 1:
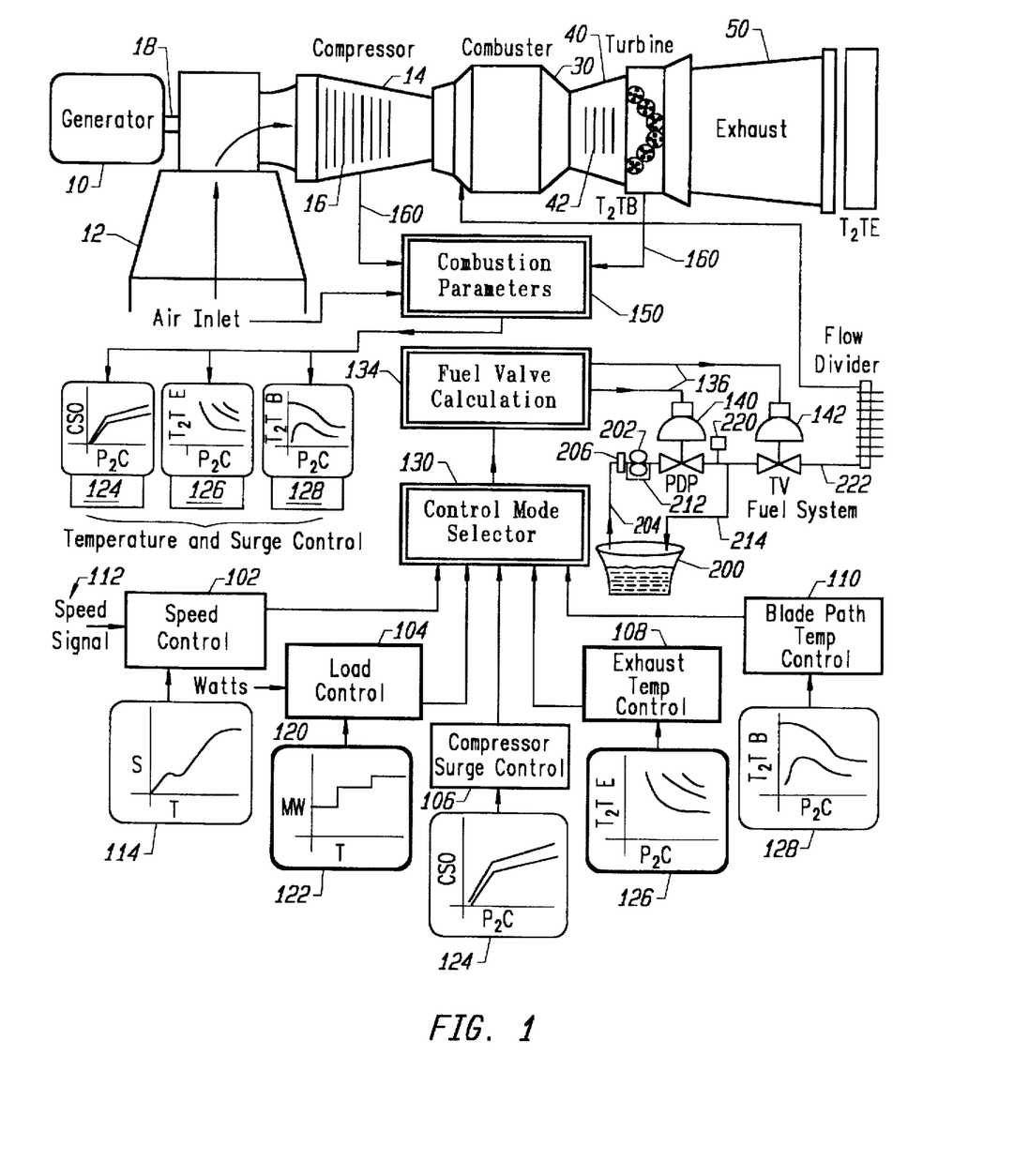
FIG. 1 is a schematic arrangement of a typical industrial gas turbine generator and the limiting parameters of the control system used to schedule fuel flow for accelerating and loading the gas turbine.

Turning now to FIG. 1, a gas turbine fuel system interface is shown. The turbine generator 10 consists of an air inlet plenum 12 which directs ambient air into a compressor 14. The compressor 14 is an axial flow compressor having blades (not shown) mounted on disks 16 which are attached to the unit shaft 18. Between each disk 16 is a stationary diaphragm (not shown) containing stationary blades (not shown) for converting the kinetic energy imparted to the air by the rotating blades into pressure. Each combination of a disk and diaphragm constitutes a compression stage 22 which increases the pressure of the air before discharging it to the next stage. The air pressure is increased through each axial stage of the compressor 14 and is then directed to a combustor 30.

The combustor 30 consists of a number of combustor baskets (not shown) mounted concentrically around a shaft 18. Each combustor basket assembly contains a fuel nozzle (not shown) for delivering fuel to the combustor assembly. The fuel and compressed air are turbulently mixed in the individual combustors and are ignited by one or more spark plugs (not shown). The hot combustion gases are subsequently directed to an expander/turbine 40. The expander/turbine 40 consists of blades (not shown) mounted on the peripheral edges of disks 42. Between each disk 42 is mounted a stationary diaphragm (not shown) containing nozzles or blades which accelerate the gases flowing through them. The gases impact the blades causing rotary torque to be transmitted to the shaft 18. After passing through all the turbine/expander nozzles and rotating blades, the gases enter an exhaust duct 50 which directs the turbine exhaust gas to the atmosphere. The rotary torque imparted to the shaft 18 by the expansion of the hot gases drives generator 10 which in turn produces electricity which is supplied to an electric transmission grid (not shown).

Also shown in FIG. 1 is a typical schematic of the fuel oil control system used to start and load the gas turbine. A typical fuel oil system is presented herein, but it is recognized that fuel gas or a combination of fuels are also possible fuel supplies that can be monitored by the QSP system. Blocks 102, 104, 106, 108, and 110 represent various control circuits to develop or limit a fuel demand signal. Block 102 is a speed or revolutions per minute (RPM) control circuit. The circuit receives an RPM signal 112 from a shaft mounted tachometer or pulse sensor circuit (not shown) and compares it to programmed RPM demand signals. A plot of exemplary programmed RPM demand or speed reference signals is shown in graph 114.

Block 104 represents a load control circuit which receives a generator output or WATT signal 120. The load demand signals are programmed in relation to the time at which the generator circuit breaker is closed, as shown in the exemplary graph 122.

Block 106 executes a typical compressor surge limit function. Surge is an uncontrolled pressure fluctuation occurring within a compressor when certain pressure-volume temperature relationships exist which cause unstable operation of the compressor. The surge limiting area signals contained in graph 124 map the surge limiting area for the particular compressor being used. Thus, the compressor surge control block 106 can develop a reference limiting signal to prevent the compressor from entering unstable operation.

Block 108 contains control circuitry to limit excessively high turbine exhaust gas temperatures. Graph 126 contains exhaust gas temperature starting design temperature limit signals for the particular gas turbine. The exhaust temperature control block 108 develops a reference limit signal to reduce gas turbine load if the exhaust temperature exceeds design limits while loading the generator.

Finally, block 110 contains circuitry to develop a limit mode in the case of high temperatures in the turbine blade path during start up or excessive power while loading the generator. Turbine design information signals, as represented in graph 128, are fed to block 110 which in turn produces a limit signal to prevent high temperatures.

Signals from the speed control block 102, the load control block 104, the compressor surge limit block 106, the exhaust temperature limit block 108 and the blade path temperature limit block 110 are fed to the control mode selector block 130. The control mode selector block 130 acts as a low signal selector to choose the lowest limiting control mode demand signal. In this manner, if a limit, such as high exhaust temperature or surge limit, is encountered, the control system will reduce the fuel demand signal until the lowest limit condition is satisfied. If the lowest limit is not set by blocks 124, 126, or 128 then, speed or load control will provide the fuel demand signal. The output signal 132 from the control mode selector 130 is fed to the fuel valve calculation block 134. In the fuel valve calculation block 134, the demand signal for positioning each fuel valve is developed. The fuel flow demand signal 136 is sent to fuel oil pump discharge pressure control valve 140 and to fuel oil throttle control valve 142. The fuel oil pump discharge pressure control valve 140 maintains a fuel supply pressure (varying at start, constant at load) to the throttle control valve 142. By modulating the throttle control valve 142, the fuel valve calculation block 134 controls the flow of fuel to the combustors and thus the power output of the gas turbine generator.

Whenever the gas turbine is fired, analog values of temperature and pressure are gathered by the combustion parameters block 150 for use by the various control mode blocks. The combustion block 150 stores feedback signals of the actual operating parameters of the gas turbine and its output is routed as a function of time to the proper control block for updating and correcting the reference calculation for unit acceleration.

Figure 2:
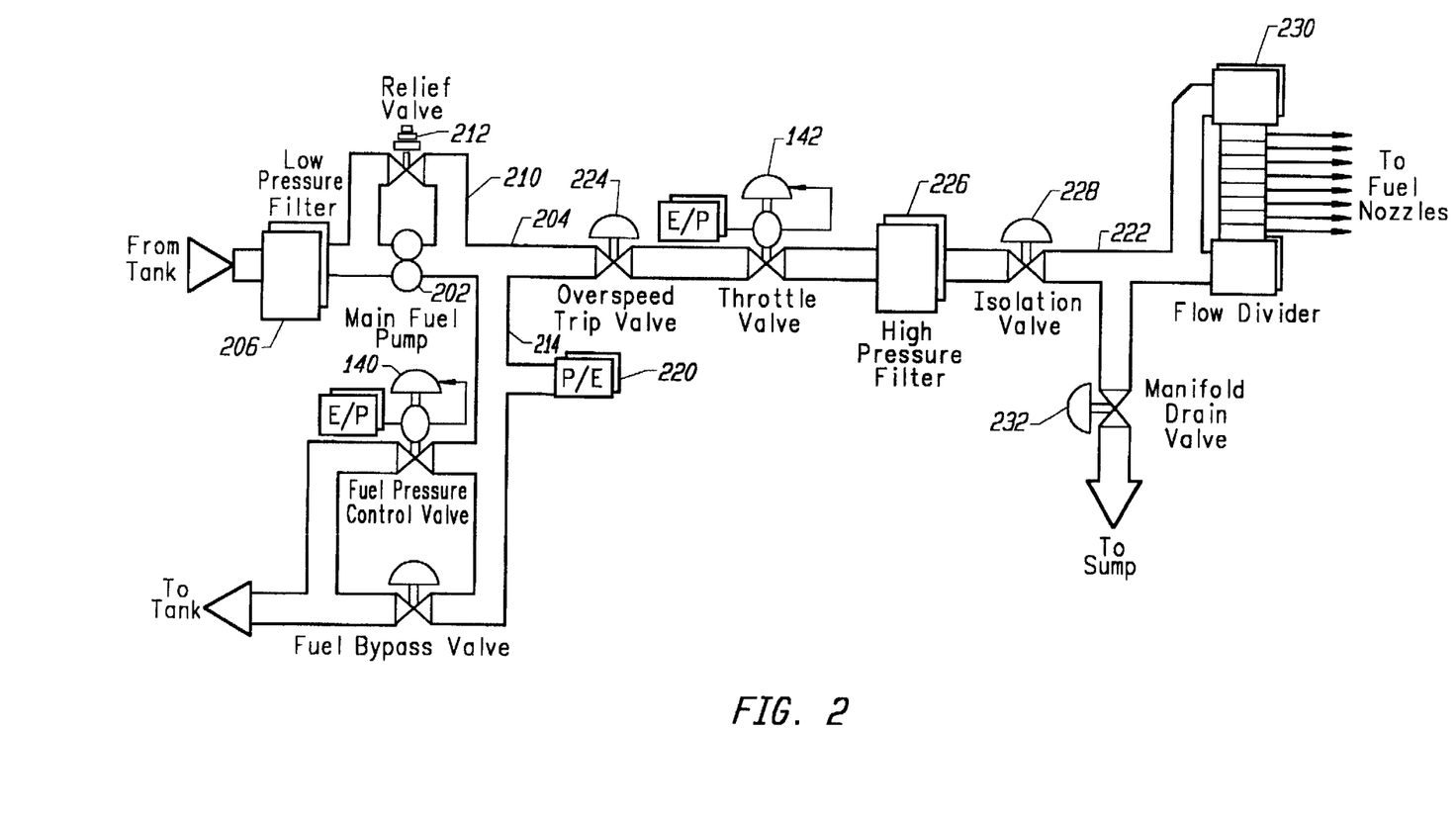
FIG. 2 is a simplified piping schematic of the typical fuel oil system components for the fuel delivery system to a gas turbine generator.

Turning now to FIG. 2, a schematic of a typical gas turbine fuel supply system is shown. A fuel storage tank (not shown) delivers fuel to a suction line 204 by means of a fuel pump 202. A low pressure suction filter 206 is provided in the suction line 204 to protect the main fuel oil pump 202 from damage caused by debris or dirt entering the pump 202. Around the pump 202 is a relief path 210 from the discharge of the pump to the suction side. The relief path contains a relief valve 212 which is set to relieve pressure if the pump discharge pressure exceeds a preset pressure setpoint. The discharge of the pump 202 also contains a return line 214 which returns oil to the storage tank. The return line 214 contains a fuel oil pressure control valve 140. As described previously, the fuel valve calculation block controls fuel oil pressure control valve 140, which acts to schedule fuel pressure during initial start up and thereafter to maintain a constant supply pressure to the oil throttle valve 142. Also mounted at the discharge of pump 202 is a pressure transducer 220, which provides a fuel oil pressure signal to the fuel valve control calculation block 134 in FIG. 1.

Fuel oil from the pump discharge is piped to the fuel oil overspeed trip valve 224, throttle valve 142, a high pressure filter 226, and an isolation valve discharge 228. The fuel supply line 222 connects to a flow divider 230 which proportions the fuel oil supplied to the fuel nozzles (not shown) on the gas turbine. The overspeed trip valve 224 is controlled by the overspeed trip mechanism and the logic sequence of the control system and acts automatically to shut down the fuel oil flow to the gas turbine if the RPM of the turbine exceeds a preset limit or the unit is shutdown for other faults. The fuel oil isolation valve 228 is provided so as to cause fuel isolation or shutdown of the unit through fuel shut off. In conjunction with the isolation valve 228, a drain valve 232 is provided to allow draining of the manifold to a sump tank in the event that repetitive malfunction can produce excess fuel oil that requires draining from the fuel manifold.

Attention now turns to the use of the QSP system. The control system of the invention protects equipment by causing a shutdown when dangerous design limits are reached. The protective limits are normally set as high as practical to provide continued operation and to avoid forced outage. A preferable implementation of the QSP system is to provide the unit operator with a means to anticipate shutdown conditions before they exist. This can be accomplished by an automatic or manual operator review of each designated shutdown for its fault risk.

Typical system protection against malfunctions can be broken down into four major categories. The first category is local shutdown signals. These signals cause the control system to shut down an operating turbine if the input parameter measured is outside a preset range. One example is if the turbine RPM is greater than 112% of rated speed. This condition indicates an uncontrolled overspeed condition that could result in the destruction of the unit and therefore warrants immediate shutdown.

The second category is remote shut down signals. These signals cause shutdowns only when the unit is operated under remote control. An example is a lube oil level alarm signal that can activate a sensory device which is monitored by an operator, but changes from an alarm signal to a shut down signal when the unit is automatically operated from a remote location.

The third category is alarm signals. These signals attempt to improve reliability or quality-of-start by directing the attention of the operator to an abnormal condition before it can result in the need for a shutdown. The alarm signals by definition are quality alerts. The warning should serve to prevent a start or to warn of a possible shutdown if the unit is running. The signals generate a visible or audible alarm to the operator, indicating the parameter is out of range. However, because of the nature of the signal, the turbine operation can continue while the operator determines the need for shutdown. An example of an alarm signal is high bearing temperature.

The final category is start permissive signals. These signals must be within a preset range status position before the logic sequence controller allows the turbine to start. For instance, before starting the turbine, a pressure transducer located in the lube oil bearing header must indicate that sufficient lube oil pressure is supplied to adequately protect the turbine bearings. If 10 psig lube oil pressure is required to protect the bearings, the design pressure for the system may be on the order of 15 psig to provide adequate margin. The start permissive switch may be set at 12 psig. Under these conditions, if actual lube oil pressure at the start command for the turbine was 13 psig, the permissive condition would be satisfied and the turbine would be permitted to start. However, the measured condition indicates a significant deterioration somewhere in the lube oil system. For example, the lube oil pump is worn, the turbine bearings are worn, or a regulator valve may be functioning improperly. The quality-of-start precursor (QSP) system monitors this deviation from design parameters and weighs the risk that the next start may not be successful because of deterioration in the lube oil system.

Figure 3:
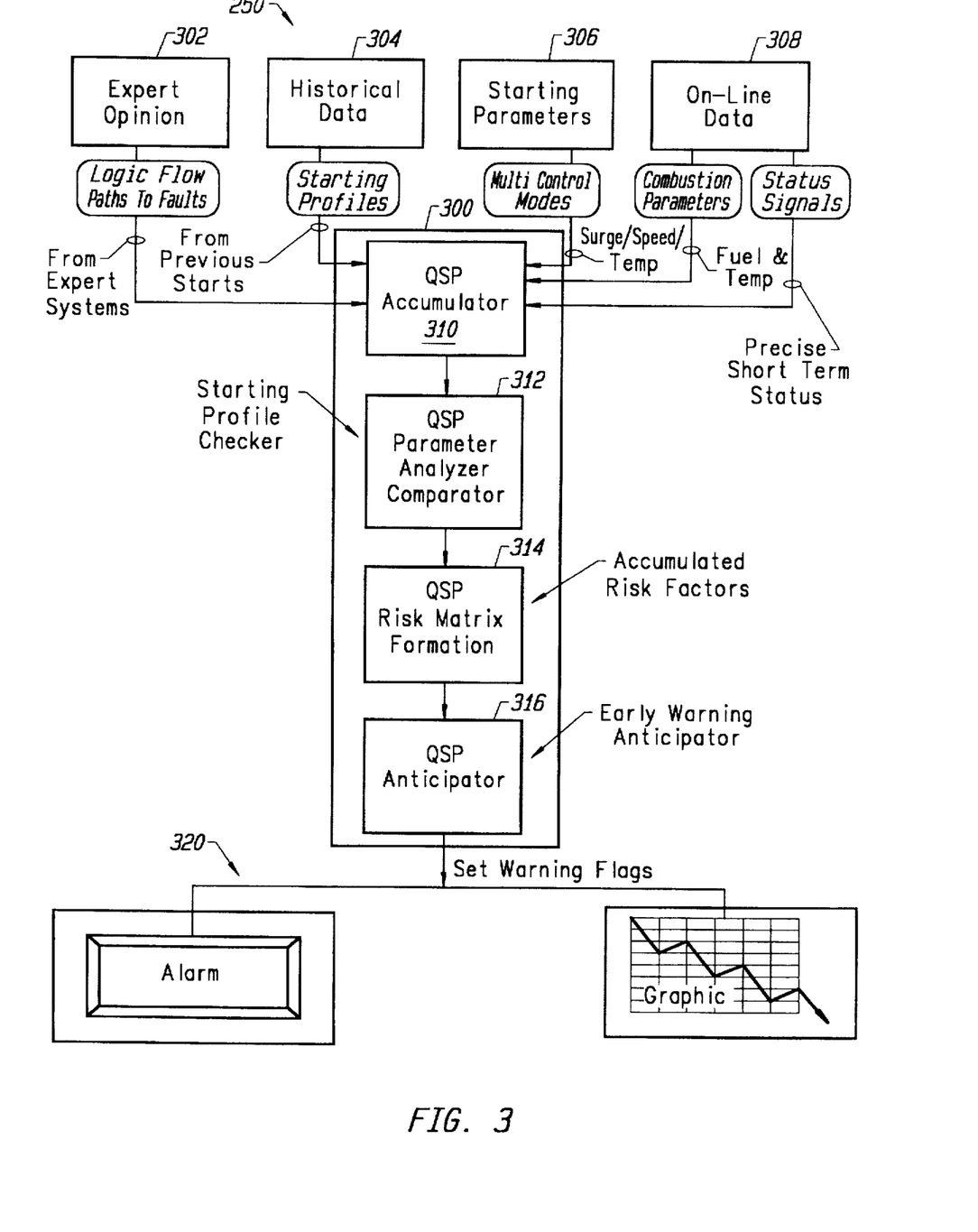
FIG. 3 is a flow chart of one embodiment of the quality-of-start precursor (QSP) system of the invention.

Turning now to FIG. 3, a flow chart of the quality-of-start-precursor (QSP) system 250 is depicted. The system 250 includes a QSP computation block 300. The QSP computation block 300 will be described in the context of a digital computer, but it should be appreciated that the device may also be implemented as a hardwired circuit or other equivalent device. The QSP computation block 300 gathers data, compares and analyzes key system relationships, and assesses the risk of different faults. Preferably, the QSP computation block 300 operates independently of the turbine control and protective system, forming its own conclusions as to the integrity of the monitored system.

As will be described below, a preferable embodiment of the QSP computation block 300 utilizes a "risk matrix" to predict the possibility of a fault. A complex fault having both certainty factors and association factors may involve the interconnection of one or more matrixes.

As illustrated in FIG. 3, the QSP computation block 300 receives input factors from four different sources: an expert system block 302, an historical data block 304, a starting parameters block 306, and an on-line data block 308. The expert system block 302 stores accumulated expert information regarding unit design and operation. The expert information includes information on start up conditions that suggest a forthcoming fault. The expert opinion block 302 may include optimized logic paths that establish solutions defining the causes of previous faults. These logic paths may be used to establish the framework of the problem and the possible direction for prediction of a future fault.

The historical data block 304 includes normal design profiles that can be accessed by the QSP block 300 for comparison against past or present starting and loading conditions. The block 304 also stores information regarding previous starting events for a piece of equipment.

The starting parameters block 306 establishes normative starting conditions and profiles corresponding to an original turbine design. The starting conditions and profiles can be tracked by the QSP computation block 300 on a real time basis and compared for discrepancy and weighted for predictions of future faults. Examples of profiles that can be used in connection with this block are shown in FIG. 1. Namely, programmed RPM demand signals (block 114), load demand signals (block 122), compressor surge limiting signals (block 124), turbine exhaust design temperature limit signals (block 126), and turbine exhaust temperature starting design information signals (block 128) may be used as normative design profiles for comparison with data currently generated in real-time.

The final QSP computation block input is the on-line data block 308. As its name implies, the on-line data block 308 is used to provide current data to the QSP block 300.

Turning now to the internal operation of the QSP computation block 300, the internal operation can be characterized by blocks 310, 312, 314, and 316. Block 310, designated the QSP accumulator 310, serves to gather pertinent information necessary to form a decision for predictive analysis and stores this information in a form for access by other programs in the QSP computation block 300. Thus, the QSP accumulator 310 may be implemented as a set of program instructions, implemented using standard programming techniques, to receive signals from the expert system data base 302, the data base of historical information 304, and the starting parameters 306. The received signals may then be compared with the on-line data signals 308 to generate a set of comparison signals corresponding to differences between the on-line data signals and the normal starting parameter signals, the signals from the data base of historical information, and the signals from the expert system data base.

Block 312, the QSP Parameter Analyzer Comparator, processes the comparison signals in reference to a set of predetermined thresholds so as to identify comparison signals that exceed the predetermined thresholds. In other words, the analyzer circuit 312 identifies transients of control starting profiles to establish out of normal range signal excursions. Programming techniques may be used to make the necessary comparisons.

Block 314, QSP Risk Matrix Formation, serves to gather the comparison signals into a computation matrix. The matrix is composed of significant variables determining starting reliability. The matrix may be implemented using database techniques wherein a record is created for each piece of input data affecting reliability of start and for each possible condition associated with shutdown. Records may also be made available for intermediate determinations. A record may have character fields for such things as the name of the variable, memo fields for messages to be displayed and numerical, logical and date fields as required.

The different key factors assembled for block 314 are preferably assigned weighting values proportional to their contribution to the predictive conclusion of the success of the next start. The weighting factors are assigned by expert consultation, original design criteria and operating field experience. By necessity the weight factors are adjustable and molded by field performance and site conditions.

A simple example of the use of weighting is illustrated by the option of the choice of fuels to be burned. It is generally recognized that combustor firing on gas fuel is more reliable for starting than oil fuel. The negative weight factor against oil becomes even more significant when the unit is attempting to start in cold weather, or a long time has elapsed since the last start.

The scores obtained by attaching the weight factors to each possible parameter of the fault condition may be converted into positive or negative inputs to the matrix. This provides a means of algebraic summation to compare vulnerability to shutdown from each of the significant faults. In the simplest form, if there are 10 negative, 20 neutral, and 2 positive inputs, yielding a net output of 8 negatives from a selection of 32 total; then, the QSP computation block 300 would rate that future start as a 8/32 or 0.25 negative conclusion. Another fault calculation obtaining a 0.50 negative conclusion might place it at twice the risk of future shutdown. To extend the process of precursor prediction, the system assigns the matrix factors for weighting according to defined criteria. That is, a particular function may have a high value of credibility for predictability, and it may also be an event that has high probability of occurrence. The influence of probability can be further added to form the conclusion. In the above example with the credibility factor of 0.50, assuming the highest probability factor of 1.0 would place this shutdown high on the list of candidates for future shutdown.

$$\begin{aligned}\text{Precursor prediction} &= \text{credibility} \times \text{probability} \\ &= 0.50 \times 1.0 \\ &= 0.50\end{aligned}$$

In this manner the total turbine system can be compared and evaluated for a unit quality-of-starting reliability.

Block 316, the QSP Anticipator, receives the matrix results which define the high risk potential shutdowns. The information received is conditioned and serves to generate output signals 320, which may be in the form of alarms, printer outputs, graphic displays, or control signal instructions for future starts. By way of example, the control instructions for future starts may be conveyed as a set of commands to the control mode selector 130 of FIG. 1.

Although FIG. 3. shows internal components of the QSP Accumulator block 310 and the QSP Parameter Analyzer Comparator block 312 providing output data to the Risk Matrix Formulation block 314 before a prediction is generated, it is readily understood that a simplified form of the QSP computation block 310 can be accomplished through other methods of analyzing and comparing the data than the Risk Matrix method. The Risk Matrix prediction is presented as an example of one of a number of statistical or mathematical methods which can be used to compare the accumulated data from blocks 310 and 312.

Figure 6:
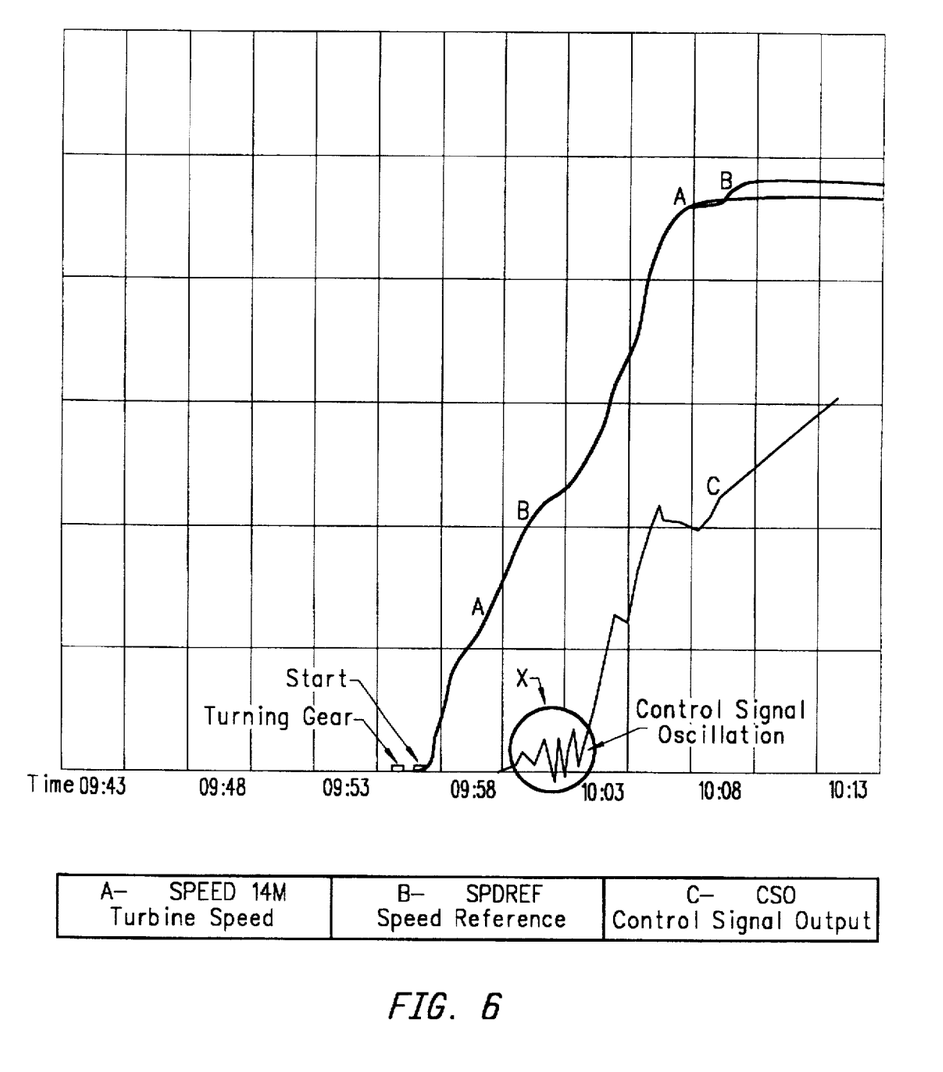
FIG. 6 is a start up graph for a typical unit showing the real time relationships for turbine speed, speed reference, control signal and fuel control signal output for a typical start up.
Figure 7:
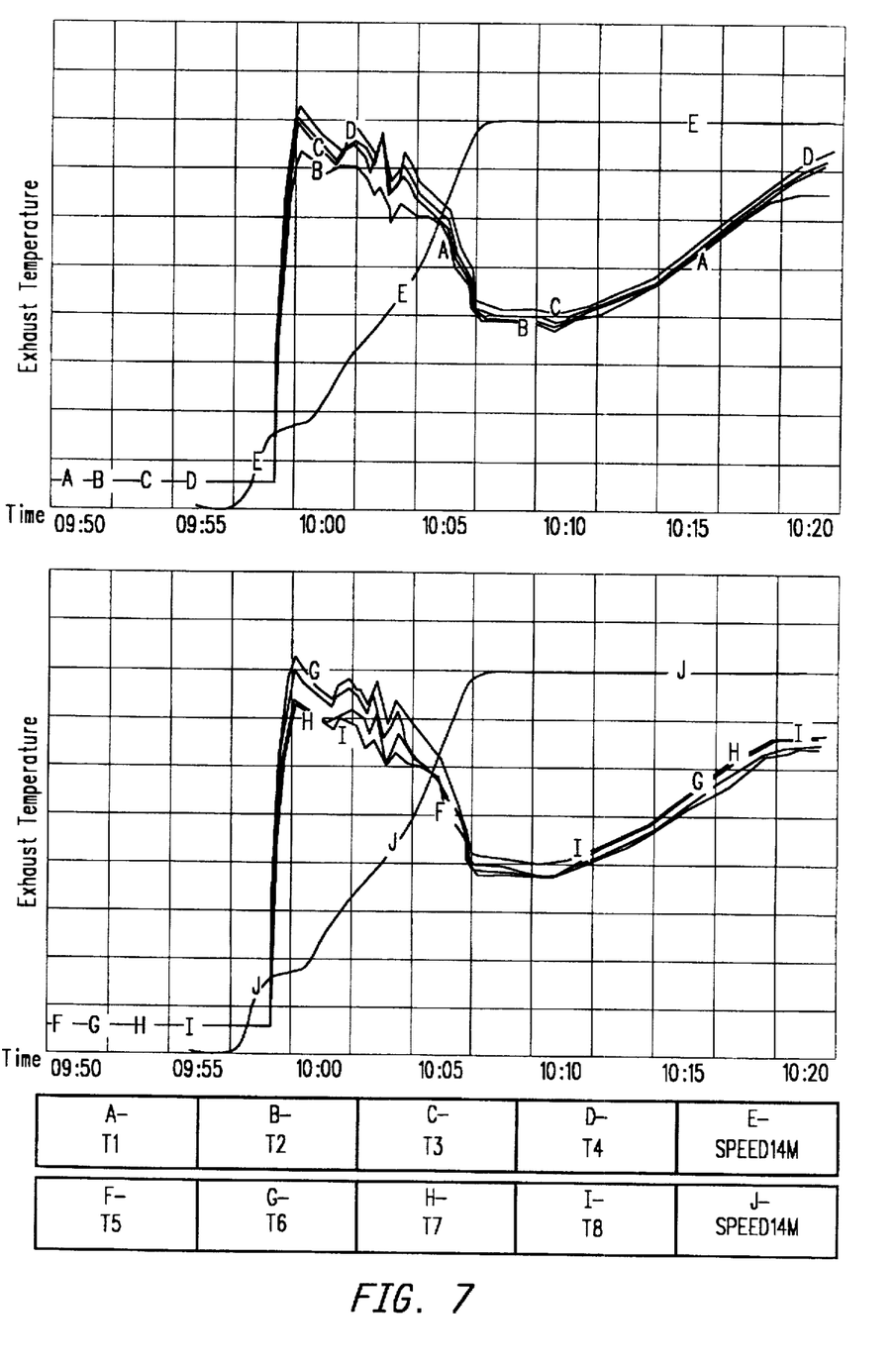
FIG. 7 is a start up graph showing turbine speed and flame indication signals from a number of combustors as a function of time during a typical gas turbine start up sequence.
Figure 8:
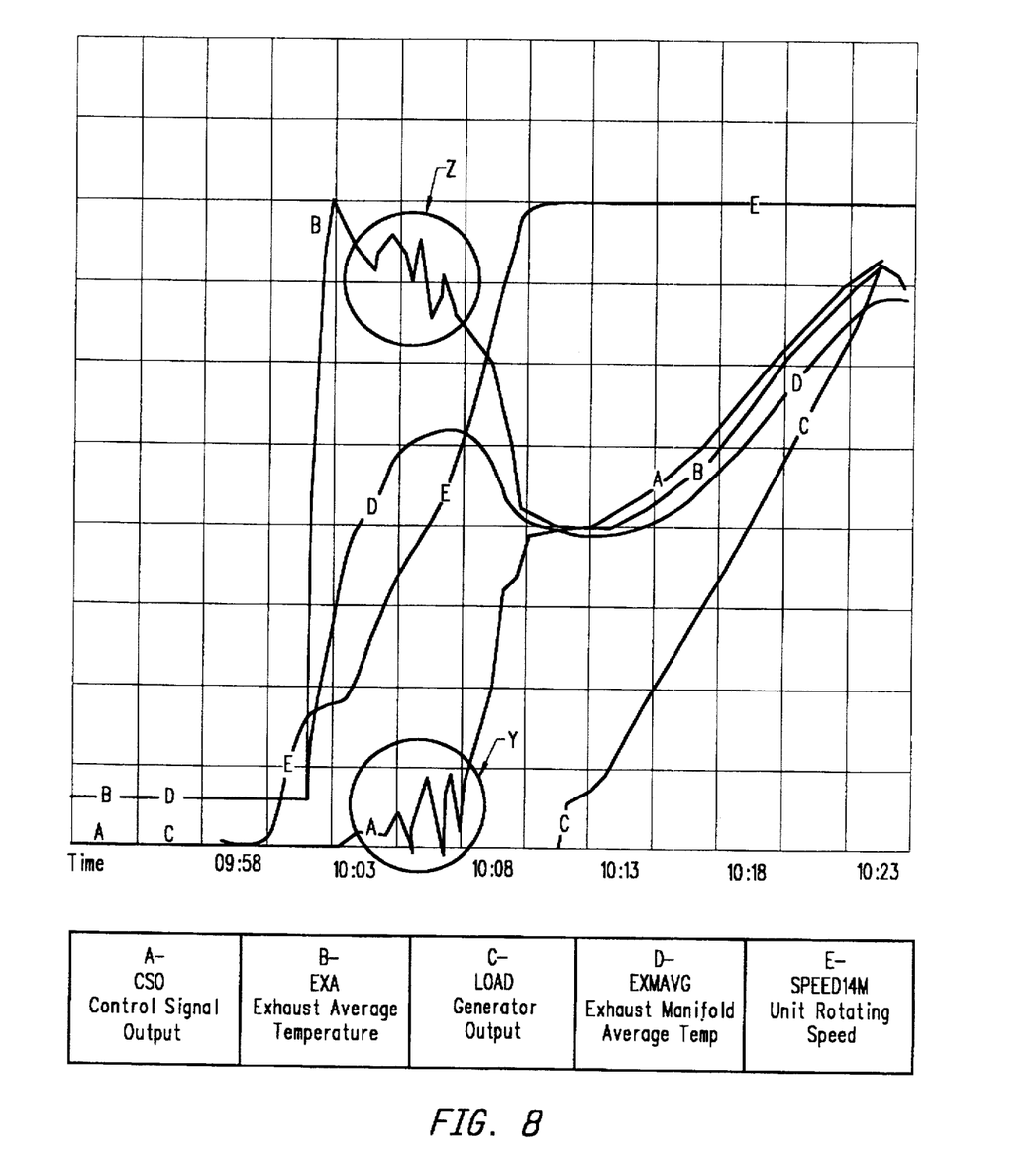
FIG. 8 is a start up graph showing some of the analog signal parameters measured for fuel scheduling and control monitoring for unit start up.

The formation of individual customized fault matrixes, one for each system fault, is accomplished by loading the matrixes with pertinent data. By way of example, the matrix inputs can be information obtained from starting sequence profiles (FIGS. 4 and 5) and historical control profiles obtained from typical test histories (as shown in FIGS. 6, 7, and 8). The input to a specific fault matrix may be in the form of relevant threshold limits, control excursions due to maloperation, ambient conditions, mode of operation, or any series of parameters that bear on the fault prediction.

Figure 4:
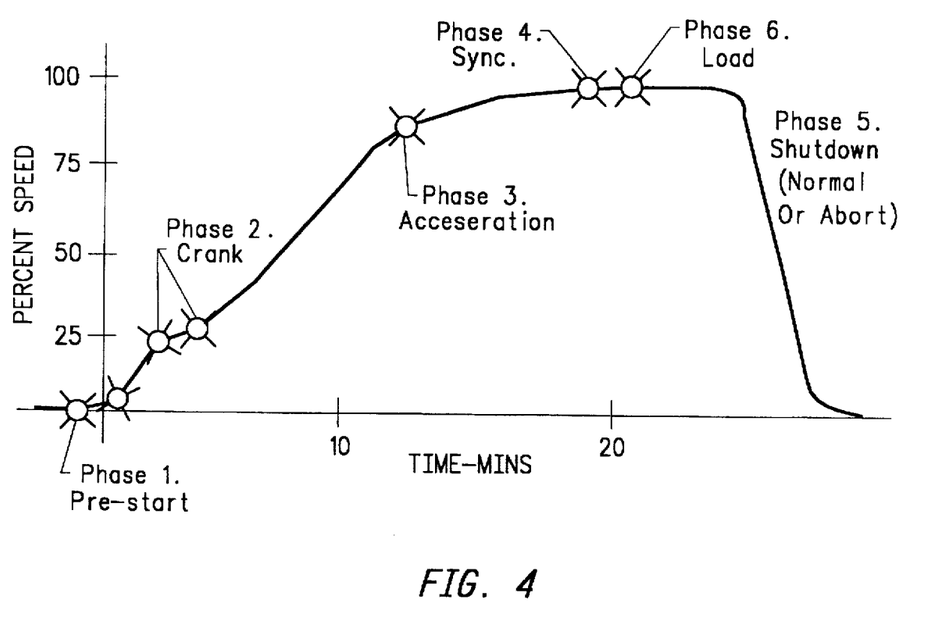
FIG. 4 is a turbine speed versus time graph showing a typical unit starting sequence with defined indication points of pre-start, cranking, acceleration, synchronization and loading phases.

Referring now to FIG. 4, a speed versus time graph is shown for a typical gas turbine start-up sequence. The Y-axis of this graph shows speed as represented by the gas turbine RPM while the X-axis indicates time in minutes from the start command given to the gas turbine. The graph is divided into six regions or phases. Phase 1 is the pre-start phase where auxiliary systems such as electric power, air and fuel oil supply systems are started and brought to their normal operating conditions. Phase 2 is the cranking phase where a diesel engine, electric or compressed air motor is used to start turning the gas turbine rotor. When the starting device has raised the speed of the gas turbine rotor to its rated speed of ignition, the compressor 14 provides sufficient air flow to support combustion. Ignitors (not shown) located at the fuel nozzle discharge are energized and fuel is admitted to the nozzles. Fuel, atomized by the nozzles, is ignited and a self sustaining flame is maintained in the combustors 30. As soon as flame is established and proven by the flame detection equipment, the ignitors are turned off. Torque is provided by the hot combustion gases, the starting device, and the turbine, thereby causing the unit to accelerate.

Phase 3 shows acceleration of the turbine from minimal speed at light off to rated speed. Since the gas turbine is designed to be efficient at its normal operating load, it is very inefficient at start-up speeds. Thus, the turbine torque available to accelerate the rotor at ignition speed is small. Therefore, the starting assist is required to provide added torque after ignition until the turbine is able to provide sufficient accelerating torque to reach self sustaining operation.

Phase 4 shows synchronization of the generator with the power grid. Phase 5 shows subsequent loading of the gas turbine generator. Because the generator is synchronized with the power grid, turbine speed is constant during this phase. Phase 6 shows gas turbine shut down during which the generator is disconnected from the electrical grid and the fuel to the gas turbine is shut off allowing the turbine speed to coast down to low speed at which time a turning gear is engaged to the rotor to slowly rotate the turbine shaft during the turbine cooling process.

Figure 5:
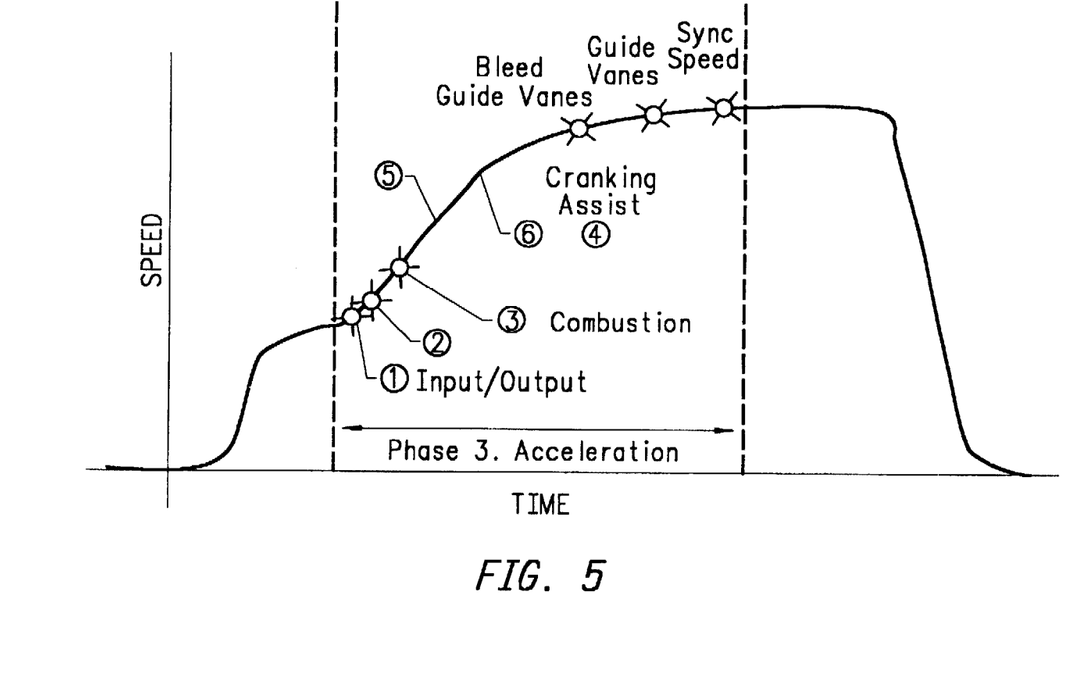
FIG. 5 is a speed versus time graph showing a typical unit starting profile detailing specific functions of the acceleration phase of the start sequence.

FIG. 5 is a speed versus time diagram detailing only the events occurring during the Phase 3 acceleration period of a typical start up of a gas turbine. A normal Phase 3 unit acceleration is dependent upon the proper interaction of fuel scheduling, fuel combustion, and the rotational torque provided by the turbine and cranking device. Fuel and ignition are provided during this phase when the unit reaches firing speed with the bleed valves open and the guide vanes closed. The bleed and guide vane reverse positions as a function of speed as the unit accelerates towards 100 percent speed and reaches the ready to load condition. Accurate position scheduling of the bleed valves and guide vanes is necessary to avoid an axial compressor pressure surge condition during the starting cycle.

During Phase 3, the control system reads inputs and generates outputs while measuring and monitoring analog values in real time to calculate critical limits for speed, compression pressure and cycle temperatures. Phase 3 introduces the operation of the fuel control system and involves the initial introduction of fuel and ignition. Time sequence checks are used to determine successful combustion as well as scheduling of speed advance. Successful firing and acceleration use an interaction of logic, control, and fuel scheduling that present high risk for fault occurrence. Thus, phase 3 provides a useful mechanism for illustrating one QSP analysis that may be executed in accordance with the invention. Phase 3 may be analyzed by considering the following parameters: input and output signals, analog firing variables, combustion integrity, cranking assist, compression degradation, and control signals.

A variety of input and output signals may be used to assess the performance of the acceleration during phase 3. These signals include compressor discharge pressure, overspeed valve reset, fuel oil pump on, atomizing air on, ignition on, and flame sensor signal output. Tardy or improper signal response when used with associated functions may indicate to the QSP system that the current start is marginal and that the next start may not be successful.

A variety of analog firing variables may also be analyzed. For example, fuel scheduling and the resultant cycle temperature are important variables for reliability of starting and extension of turbine life. Improper analog values of the measured compressor discharge pressure can result in shutdown or false limitation of the compressor surge fuel control limit and are therefore important for interpretation of starting ability via the QSP system.

Measured speed is the final acceleration output signal and is advanced by an analog computed speed reference signal.

Failure of the control system to calculate properly or to follow the speed profile curve or generate a proper speed reference can cause interruption of the starting advance or result in turbine shutdown. This variable then is important to the success of starting and lends itself to a QSP analysis in accordance with the invention.

Combustion integrity is monitored by analog signals of cycle temperature as well as flame scanner outputs. The value of compressor discharge pressure increases as the unit accelerates and is instrumental in the calculation for compressor surge limit and allowable cycle temperature profile. Both of the above functions provide protection for the unit, but the functions are also associated with improper acceleration, which can result in more unreliable operation unless the parameters are within predetermined design limits. The quality-of-start precursor block 300 may be used to track the integrity of the functions via inputs and comparison checkers.

The cranking assist provides accelerating torque from zero speed through ignition, until the unit reaches self sustaining speed. Failure of the assisting device to add design torque to that supplied by the turbine can result in unreliable starting or shutdown. The value of any variable that can limit or eliminate the horsepower contribution of the starting device will aid the quality-of-start precursor block 300 in calculating starting ability.

Compressor degradation (fouling) can be a significant detractor to the acceleration process and therefore lends itself to quality-of-start precursor analysis in accordance with the invention. For example, failure to generate design compressor discharge pressure can affect firing performance, cause temperature control and retard unit acceleration.

The control signal generated is the scheduling and limiting signal for final output to the fuel scheduling system. This signal is used for the primary scheduling of fuel for acceleration of the unit. The signal may be developed by the contribution of the five control modes defined by the functional plots displayed in FIG. 1 (blocks 114, 122, 124, 126, and 128). These blocks define the functional relationships stored within the control system that enable the unit to accelerate and complete Phase 3. The quality-of-start precursor system of the invention tracks the normal generation or base print of these signals and uses this information to predict feasibility of future start ups.

The speed versus time graphs shown in FIGS. 4 and 5 may be one of a number of design control profiles programmed within the starting parameter block 306 described above. This information can then be used for analyzing phase 3 performance.

The QSP computation block 300 in FIG. 3 receives actual speed and time data from the on-line data block 308 and compares ongoing speed versus time data with the speed reference generated by the control system and the factory design speed versus time profile stored in block 306.

During phase 3 acceleration, the ramp of unit speed presents a number of critical areas for predictive review where turbine sequence functions occur. The functions can cause speed transients that are within allowed tolerance, yet are useful for measuring the quality of the current start to form the prediction of the next start. Such is the case for: (1) the speed change within the 30 second light off period; (2) the speed change immediately after the ignition period; (3) the speed change resulting from the initial fuel supplied to the combustors; (4) the speed rate of change versus the fuel supply pressure to the unit; (5) the speed change as a result of initial fuel valve opening; and (6) speed transient from positioning surge control valves. Wherever a control function occurs during the generation of the speed versus time relationship, there is a normal excursion for that function, for example, the speed change or rate of speed change at ignition caused by initial combustion. Abnormalities at this point are indicative of future problems. After ignition, the speed versus time relationship is driven by a stored reference profile which is used to accelerate the unit from ignition to full speed.

During acceleration, the unit control system checks any delay in the turbine normal acceleration and protects against damage through the monitoring of a series of timed periods. However, the allowed time by necessity provides tolerance for speed advance while providing shutdown protection in the event of exceeding the allowed elapsed time limit. Therefore, a measure of the quality-of-start can be obtained by comparing the actual speed change within each of the allowed time periods against the design limits.

The speed reference ramp can be automatically interrupted by high cycle temperature, surge control or other protective control modes. An additional predictive tool of the QSP system is then provided by determining the cause of the interruption of the normal acceleration. Another transient effect on the speed ramp that may be indicative of future problems is provided from a number of specific logic sequence events that occur in any gas turbine starting cycle. Such functions as cranking device, bleed and inlet guide vanes, fuel addition, as well as control mode limits offer opportunities to predict the health of the unit for future starts.

The QSP system can compare the normal design profiles for the above functions versus current data for delayed acceleration or undesired transients. Any significant deviation between the two sets of data is an indication that some event in the start up sequence did not occur as designed. For example, if actual turbine RPM after ignition fails to accelerate properly through the allotted timing zones, it is a strong indication that the cranking assist is improper, fuel control is not scheduled to design values, combustion is not supporting acceleration, or cycle component parts have degraded. Thus, even if the unit under these conditions does eventually reach idle and go on line, the QSP system notes that there was something limiting the start program and that inspection or maintenance is warranted to prevent the next abort. By comparing the measured parameters to their expected design values, the QSP system can narrow down the possible reasons for the failure and provide the operator with more definitive information to avoid a future unscheduled shutdown. For instance, in the above example of delayed acceleration, the QSP model would compare starting motor voltage and amperes, or air supply pressure in the case of an air driven starting motor to its design values to determine if the cranking assist is at fault rather than control or combustion.

Other functions that can cause a delay in acceleration or interruption of the starting sequence are the limiting control modes which can be the result of improper fuel control scheduling. These modes can also be used in the predictive analysis.

For delayed acceleration, the QSP system can also check the response of the control modes and the elapsed time spent on the limit to indicate a degradation in the quality-of-start. The QSP system can be used to check the fuel valve excursions, speed control loop or combustion system helps to determine whether the delay will cause difficulty in the next start.

If the starting device or control limiting is not at fault, the QSP system would proceed to analyze the combustion function. A critical review by the QSP system and comparison of the analog values relating to the combustor outlet temperatures might produce temperature spreads that are within tolerance, short of shutdown, but poor when compared to design conditions. A more specific review in the early firing of Phase 3 acceleration might indicate late flame sensing of ignition or poor combustion that is contributory to reduced acceleration. Abnormalities of combustion may then point to fuel and atomizing air maintenance that can serve as a quality-of-start precursor alert to prevent the next start.

As indicated above, the speed versus time graphs shown in FIGS. 4 and 5 are several of a number of design functions programmed into the starting parameters block 306, FIG. 3 described above. The QSP computation block 300 receives actual speed and time data from the on-line data block 308 and compares the actual speed-time relationship to the design speed versus time relationship. Any significant deviation between these two sets of data is an indication that some event in the start up program did not occur as designed. For instance, if turbine RPM during starting fails to reach 50% of rated speed, it is a strong indication that either starting device assist was marginal, or not all combustors are firing, or the advance of the sequence has been control limited. Thus even if the gas turbine generator unit under these conditions does eventually reach rated speed and go on-line, the quality-of-start precursor system notes that there was something unique during the start program and that inspection or maintenance action is warranted. Through the comparison of expected design parameters with field test performance, as shown in FIGS. 6, 7, and 8, the QSP system 250 can narrow down the possible reasons for the improper start and provide the operator with more specific trouble shooting information. The risk matrix output for each specific shutdown fault points to those risks that will provide the most return in reliability improvement.

Table I is a list of typical measured variables which the QSP system monitors for significant variation from design conditions during start up.

TABLE I

TYPICAL QSP PARAMETERS — Phase 3

Pre-Firing Conditions:

1. Identity of last shutdown
2. Fuel selected
3. Elapsed time since last start
4. Quality of previous start
5. Ambient temperature Firing Effectiveness:

1. Ignition effectiveness (time/baskets)
2. Flame propagation (profile/exhaust temperature)
3. Atomization pressure (purge/pressure)
4. Fuel oil nozzle pressure (flow/stability)
5. Fuel oil pressure generator (stability/limits)
6. Cranking ability (compressor/torque)

Control Mode Limiting
Supported by measured variables and X, Y design plots and dynamic comparison:

1. Speed
2. Surge
3. Blade
4. Exhaust
5. Minimum fuel limit

Speed Versus Time Profile
With some of the designated key points of transient response.
Definition and expansion of uniqueness of classic starts:

TABLE I-continued

TYPICAL QSP PARAMETERS — Phase 3

1. Initial set point fuel oil
2. Fuel oil pressure overshoot
3. Fuel oil steady state pressure at ignition
4. Speed transient at light-off
5. Speed reference versus measured speed
6. Speed limiting from ignition to sync speed
7. Speed response to stop of start device
8. Speed response to cross-over of maximum fuel pressure with throttle valve stroke
9. Sync speed throttle valve control signal and valve stroke excursion Variation from design values for each of these parameters is an indicator that the next turbine start may not be successful and that inspection or maintenance may be necessary. For instance, if one fuel oil nozzle pressure drop is significantly higher than others, it may indicate fuel nozzle plugging. The importance of some non-monitored functions may dictate the addition of specific sensing equipment to the basic control system.

FIGS. 6, 7, and 8 display some of the turbine starting parameters that are useful in detecting abnormal turbine starting patterns. Most turbine generating systems are designed to be tolerant of starting transient limits in such areas as fuel scheduling and control. Tight control limits can result in excessive turbine shutdowns, therefore flexible tolerance values are provided by the manufacturer to enhance starting reliability. The QSP system is able to take advantage of unique excursions of measured variables within the design limits to add to its predictive analysis.

The profiles of FIGS. 6, 7, and 8 are the result of analog signals generated by the control system during successful unit starting. The control system uses these signals as a means of scheduling fuel or for establishing limits for protecting the equipment during acceleration. All of these signals are normally not recorded or their values are lost as historical data on initiation of the next start. The QSP system provides a means of capturing transient abnormalities that would otherwise be lost and storing them in the historical data base 304.

It is not the normal design intent of the control system itself to scan for repetitive uniformity of the quality-of-starting or the uniqueness of transient variables; but, rather the prime objective is to start and load. It is the purpose of the QSP system to track and use these signals generated during each start to look for conditions within allowable limits but unique to the normal design profile. Such subtleties of performance that can be predictive are present in the designs and the equipment operation. These include contributions of the control system, fuel scheduling, and component performance. It is the intent of the QSP system to focus on any such anomaly within the unit systems that can add to predictive analysis for reliability improvement. The typical test starts shown in FIGS. 6, 7, and 8 illustrate how information can be used by the QSP system to make predictions.

FIG. 6 shows dynamic test traces of three (3) key variables that are useful in determining the quality-of-starting: speed reference or desired speed, actual turbine speed and the control signal output which schedules the fuel necessary to meet the desired acceleration time. This figure presents a profile of a successful start even though there is evidence presented of possible failure during future starts. The area displayed by "x" depicts an excessive fluctuation of control signal output (CSO) which can result in flame-out or over temperature shutdown.

Critical deviations from the normal profiles can occur at a number of other trouble areas such as, ignition, during acceleration, and at idle speed. The deviations when defined can then become part of the QSP predictive checking matrix formation. For example, failure to light off promptly, although within the prescribed time limit, presents a negative input to the risk matrix formation for combustion for the QSP prediction.

FIG. 7 shows eight (A-H) combustor outlet temperature profiles measured at the turbine discharge for a typical start. Spreads of temperature indicated are within the design limiting range to allow unit starting, but the spread of 15 temperature profiles suggests additional monitoring and maintenance check is required to avoid shutdown due to nozzle plugging. Ignition, however, is prompt and consistent for normal burner stability. In this example, the promptness of ignition is an indication of the normal expected design transient and therefore presents a positive input to the risk matrix for the ignition quality. 20 FIG. 8 shows five (A-E) of a number of variables important to consistent turbine acceleration patterns. Oscillation of control signal (circled area "Y" in FIG. 8) during early ignition, although ramping speed within design time limits is excessive for the norm, implies some instability of control signal. The resulting fuel oscillation causes the swings in exhaust temperature shown by circled area "Z" in FIG. 8. The assigned target range for the quality-of-start precursor limit in this case can provide a means of warning to prevent flame-out or over temperature shutdown due to the fuel transients experienced.

The foregoing profiles were considered acceptable by the control system to continue operation of the unit. Nevertheless, the QSP system while routinely observing and analyzing the desired design profiles can independently find the same start unacceptable and therefore indicate high risk of shutdown for the next start process.

The examples analyzed above illustrate how data available from a turbine unit can be used by the QSP system to form predictions regarding the future operation of the turbine unit. The QSP system may be used with steam and gas turbines, as well as with other rotating equipment. Common parameters that can be analyzed include bearing oil supply pressure and temperature, shaft vibration, unit speed, and cycle temperatures.

Most commercially sold turbine units employ a single sensor per function. The QSP system is enhanced through the addition of redundant sensors for comparisons of parameters. The quality-of-start during unit acceleration is dependent upon a number of events and conditions occurring as a function of time; however, after completion of the starting cycle, the unit load performance can also be predictive of impending future start problems that can be further analyzed by added performance measuring instrumentation.

Having thus described an exemplary embodiment of the QSP system, it will be apparent to those skilled in the art that changes can be made to the system, such as the equipment monitored or the variables sensed, without departing from the intent and scope of the invention.

We claim:

1. An apparatus to assess the performance of a start of a piece of equipment said apparatus comprising:
   - an accumulator to compare a set of on-line data signals corresponding to the starting performance of said piece of equipment to a set of normative starting parameters so as to identify a set of comparison signals;
   - a risk factor assessor to process said comparison signals and generate quality-of-start prediction signals corresponding to the likelihood of success of future starts of said piece of equipment; and
   - an anticipator to process said quality-of-start prediction signals and generate output signals, including control signal instructions for future starts of said piece of equipment, for use to improve the starting performance of said piece of equipment.

2. The apparatus of claim 1 wherein said output signals include one or more of the following signals: alarm signals, printer output signals, and graphic display signals.

3. The apparatus of claim 1 further comprising:
   - an analyzer to process said comparison signals in reference to a set of predetermined thresholds so as to identify comparison signals that exceed said predetermined thresholds.

4. The apparatus of claim 1 wherein said set of normative starting parameters is selected from the group including: programmed RPM demand signals, load demand signals, compressor surge limiting signals, turbine exhaust design temperature limit signals, and turbine exhaust temperature starting design information signals.

5. The apparatus of claim 1 further comprising:
   - a database of historical information relating to starts and design profiles of said piece of equipment, said database of historical information being accessed by said accumulator to generate said set of comparison signals.

6. The apparatus of claim 1 further comprising:
   - an expert system containing information to identify fault conditions in starts of said piece of equipment, said expert system being accessed by said accumulator to generate said set of comparison signals.

7. The apparatus of claim 1 wherein said risk factor assessor utilizes a matrix of weighted risk factor values.

8. The apparatus of claim 7 wherein each weighted risk factor value of said matrix of weighted risk factor values is weighted proportional to its contribution to a predictive conclusion of the likelihood of success of future starts of said piece of equipment.

9. The apparatus of claim 8 wherein each weighted risk factor value is assigned by a technique selected from the group including: expert consultation, original design criteria, and operating field experience.

10. A method of assessing the performance of a start of a piece of equipment, said method comprising the steps of:
    - comparing a set of on-line data signals corresponding to the starting performance of said piece of equipment to a set of normative starting parameters so as to identify a set of comparison signals;
    - processing said comparison signals to generate quality-of-star prediction signals corresponding to the likelihood of success of future starts of said piece of equipment; and
    - converting said quality-of-start prediction signals into output signals for use to improve the starting performance of said piece of equipment, wherein said converting step includes the step of converting said quality-of-start prediction signals into control signal instructions for future starts of said piece of equipment.

11. The method of claim 10 wherein said processing step includes the step of:
    - processing said comparison signals in reference to a set of predetermined thresholds so as to identify comparison signals that exceed said predetermined thresholds.

12. The method of claim 10 wherein said set of normative starting parameters of said comparing step are selected from the group including: programmed RPM demand signals, load demand signals, compressor surge limiting area signals, turbine exhaust design temperature limit signals, and turbine exhaust temperature starting design information signals.

13. The method of claim 10 wherein said comparing step includes the step of comparing said on-line data signals with database signals from a database of historical information relating to starts and design profiles of said piece of equipment to generate said set of comparison signals.

14. The method of claim 10 wherein said comparing step includes the step of comparing said on-line data signals with expert system signals from an expert system containing information regarding fault conditions in starts of said piece of equipment to generate said set of comparison signals.

15. The method of claim 10 wherein said processing step includes the step of using a matrix of weighted risk factor values.

16. The method of claim 15 wherein each weighted risk factor value of said matrix of weighted risk factor values is weighted proportional to its contribution to a predictive conclusion of the likelihood of success of future starts of said piece of equipment.

17. The method of claim 16 wherein each weighted risk factor value is assigned by a technique selected from the group including: expert consultation, original design criteria, and operating field experience.

18. The method of claim 10 wherein said converting step includes the step of converting said quality-of-start prediction signals into one or more of the following signals: alarm signals, printer output signals, and graphic display signals.

19. An apparatus to assess the performance of a start of a turbine said apparatus comprising:
an accumulator to compare a set of on-line data signals corresponding to the starting performance of said turbine to a set of normative starting parameters so as to identify a set of comparison signals.
a risk factor assessor to process said comparison signals and generate quality-of-start prediction signals corresponding to the likelihood of success of future starts of said turbine and
an anticipator to process said quality-of-start prediction signals and generate output signals including control signal instructions for future starts of said turbine, for use to improve the starting performance of said turbine.

20. The apparatus of claim 19 further comprising:
an analyzer to process said comparison signals in reference to a set of predetermined thresholds so as to identify comparison signals that exceed said predetermined thresholds.

21. The apparatus of claim 19 wherein said set of normative starting parameters is selected from the group including: programmed RPM demand signals, load demand signals, compressor surge limiting signals, turbine exhaust design temperature limit signals, and turbine exhaust temperature starting design information signals.

22. The apparatus of claim 19 further comprising:
a database of historical information relating to starts and design profiles of said turbine, said database of historical information being accessed by said accumulator to generate said set of comparison signals.

23. The apparatus of claim 19 further comprising:
an expert system containing information to identify fault conditions in starts of said turbine, said expert system being accessed by said accumulator to generate said set of comparison signals.

24. The apparatus of claim 19 wherein said risk factor assessor utilizes a matrix of weighted risk factor values.

25. The apparatus of claim 24 wherein each weighted risk factor value of said matrix of weighted risk factor values is weighted proportional to its contribution to a predictive conclusion of the likelihood of success of future starts of said turbine.

26. The apparatus of claim 25 wherein each weighted risk factor value is assigned by a technique selected from the group including: expert consultation, original design criteria, and operating field experience.

27. The apparatus of claim 19 wherein said output signals include one or more of the following signals: alarm signals, printer output signals, and graphic display signals.

* * * * *